W. F. BAHR.
SELF CLEANING RAKE.
APPLICATION FILED AUG. 9, 1913.
1,094,770.
Patented Apr. 28, 1914.
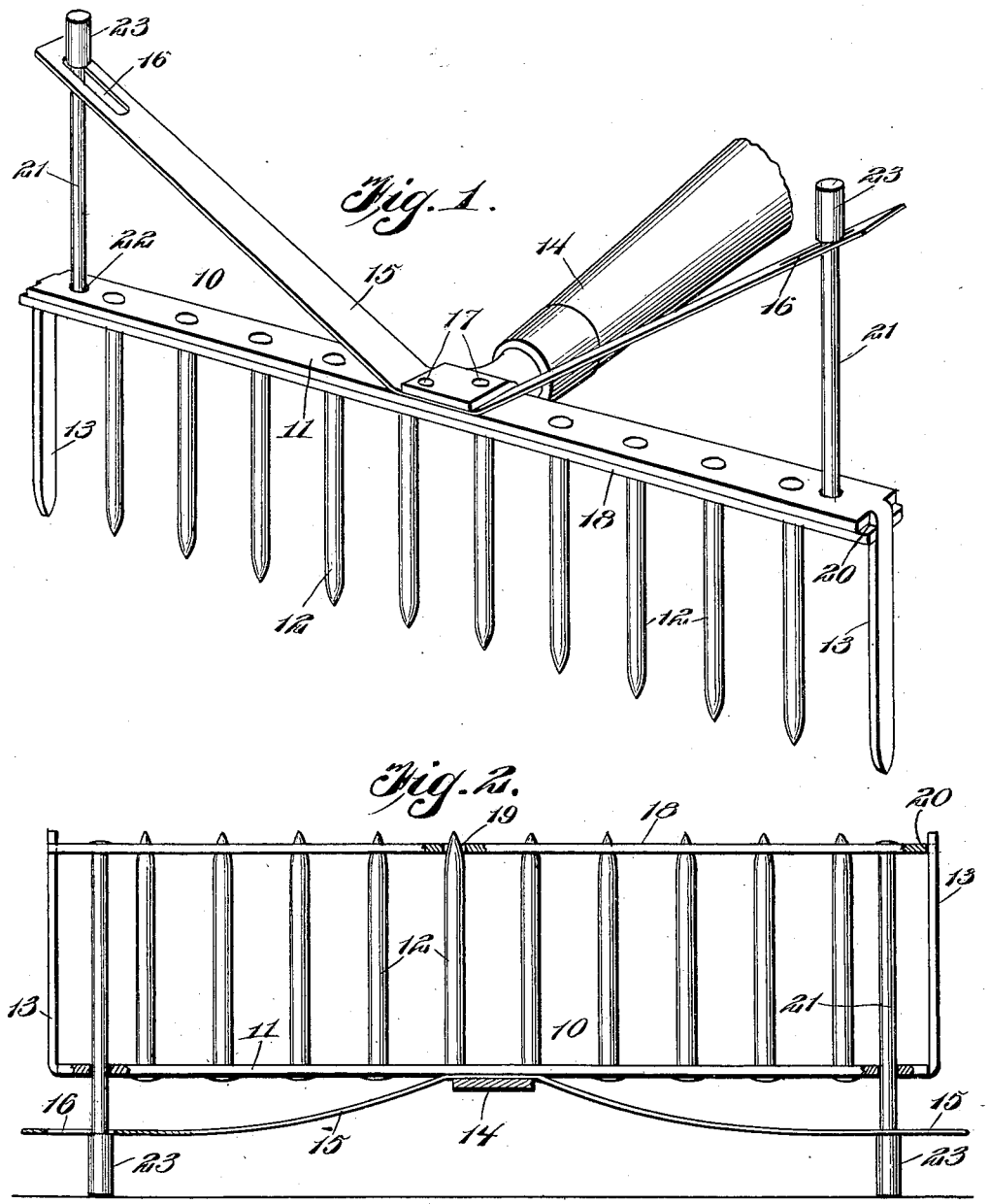

UNITED STATES PATENT OFFICE.

WILLIAM F. BAHR, OF FOWL RIVER, ALABAMA, ASSIGNOR OF TWO-THIRDS TO FREDERICK W. BACHO, OF MOBILE, ALABAMA, AND ROBERT A. HOWARD, OF FOWL RIVER, ALABAMA.

SELF-CLEANING RAKE.

1,094,770.  Specification of Letters Patent.  Patented Apr. 28, 1914.

Application filed August 9, 1913. Serial No. 783,892.

*To all whom it may concern:*

Be it known that I, WILLIAM F. BAHR, a citizen of the United States, residing at Fowl River, in the county of Mobile and State of Alabama, have invented certain new and useful Improvements in Self-Cleaning Rakes, of which the following is a specification.

The invention relates to rakes and has for an object the provision of a rake of a simple and durable construction, and in which the prongs thereof can be easily and quickly cleaned from grass, weeds and other foreign substances.

The invention comprehends, among other features, a rake having the usual prongs or teeth, with means arranged on the body of the rake, for quickly and efficiently removing foreign substances from the prongs or teeth, without soiling the hands of the operator.

In the further disclosure of the invention, reference is to be had to the accompanying drawings, forming a part of this specification, in which similar characters of reference denote corresponding parts in all the views, and in which, Figure 1 is a perspective view of the rake showing the same in normal or raking position; and Fig. 2 is an inverted front elevation of the rake, showing the manner of cleaning the prongs, parts being broken away to disclose the underlying structure.

Referring more particularly to the views, I disclose a rake body 10, including a crosspiece 11, having a series of relatively spaced prongs 12 projecting laterally therefrom, the ends of the crosspiece being preferably reduced in width and bent to form end prongs, similar in length to the prongs 12, but rectangular in cross-section to form guides 13, for a purpose that will be hereinafter more fully disclosed.

A handle 14 is provided for the rake body 10, and a flat V shaped spring 15, having longitudinal slots 16 in the ends thereof, has its medial portion interposed between the crosspiece 11 and the handle 14, suitable rivets 17, or other convenient securing members, being passed through the inner end of the handle, the medial portion of the spring and the medial portion of the crosspiece to rigidly join the same together.

A cleaning bar 18 is slidably arranged on the rake body 10, and has a series of openings 19, through which the prongs pass to permit of sliding the bar 18 relatively to the prongs, the ends of the said bar having recesses 20 formed therein and through which the guides 13 extend as shown. Rods 21 project upwardly from the cleaning bar 18 and loosely pass through openings 22, formed in the crosspiece 11, the upper ends of the said rods being arranged to pass through the slots 16, in the ends of the springs 15, with enlarged knobs 23 secured to or formed with the rods 21, and adapted to have the ends of the spring abut against the same, thus constituting stop members to retain the spring in an operative position relatively to the cleaning bar 18. Now referring to Fig. 1 it will be readily noted that the upward spring-like action of the ends of the spring holds the cleaning bar 18 close against the underside of the crosspiece 11, so that the rake can be used in the same manner as any ordinary rake, for the purpose of raking grass, stones or other substances. If the prongs should become clogged and the spaces between the prongs congested with foreign matter so as to render the rake unfit for further raking, the operator simply gives a half turn to the handle to turn the rake upside down and then presses downwardly upon the handle, thus forcing the knobs 23 against the ground and moving the rods 21 against the tension of the spring 15 so that the cleaning bar 18 will be advanced along the prongs or guides 13 and over the prongs 12, to remove the foreign matter from and between the prongs, thus quickly and efficiently cleaning the prongs from the foreign matter. When the pressure on the knobs 23 is released, the spring-like action of the spring 15 retreats the cleaning bar on the prongs and returns the same to normal position. The rake is now reversed and again used in the usual manner until the prongs are again rendered inoperative by the vegetable or other matter which is being raked.

From the foregoing description it will be apparent that my device is of a simple and durable construction, cannot easily get out of order, and efficiently and quickly performs the work for which it is intended.

Having thus described my invention, I claim:

1. A rake comprising a rake body including a crosspiece and prongs projecting therefrom, lateral guides formed at the ends of the crosspiece, a cleaning bar provided with openings through which the prongs extend and having recesses through which the said guides extend, rods projecting from the said cleaning bar, a spring carried by the crosspiece and provided with slots through which the said rods extend, and knobs on the said rods and adapted to be engaged by the spring to limit its action relatively to the said rods.

2. A rake comprising a rake body including a crosspiece and prongs projecting therefrom, guides at the ends of the crosspiece, a cleaning bar provided with openings through which the prongs extend and having recesses through which the guides extend, rods on the cleaning bar and extending in opposite directions to the said prongs, a handle for the rake body, a spring interposed between the crosspiece and the handle and secured thereto, with the ends of the spring provided with slots through which the said rods slidably extend, the said cleaning bar being movable relatively to the said prongs and against the tension of the said spring, and means on the rods for retaining the spring in engagement therewith.

3. In a rake the combination with a rake body, of a cleaning-bar having sliding engagement therewith, a handle, a spring interposed between the handle and the rake body and provided with longitudinal slots, rods carried by the cleaning bar for advancing the same on the rake body when pressure is exerted on the rods, the said rods having sliding engagement with the said spring, and passing through the slots therein, and means on the rods for limiting the sliding action of the spring on the said rods.

4. In a rake the combination with a rake body, of a cleaning bar having sliding engagement therewith provided with recesses, a handle, a V-shaped spring having its medial portion interposed between the rake body and the said handle and rigid therewith, with the ends of the spring provided with longitudinal slots, guides on the ends of the rake body and passing through the recesses in the ends of the cleaning bar for guiding the cleaning bar relatively to the rake body, and means carried by the cleaning bar and passing through the slots in the said spring, for actuating the cleaning bar relatively to the said rake body and against the tension of the said spring.

In testimony whereof I affix my signature in presence of two witnesses.

WILLIAM F. BAHR.

Witnesses:
FRANK STOLLENWERCK,
A. KELLY.

---

Copies of this patent may be obtained for five cents each, by addressing the "Commissioner of Patents, Washington, D. C."